United States Patent
Zhou et al.

(10) Patent No.: US 9,515,742 B2
(45) Date of Patent: *Dec. 6, 2016

(54) SYSTEM AND METHODS FOR ADAPTIVE EQUALIZATION FOR OPTICAL MODULATION FORMATS

(71) Applicant: AT&T Intellectual Property I, LP, Atlanta, GA (US)

(72) Inventors: Xiang Zhou, Sunnyvale, CA (US); Lynn Nelson, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,005

(22) Filed: Dec. 14, 2015

(65) Prior Publication Data

US 2016/0142149 A1    May 19, 2016

Related U.S. Application Data

(63) Continuation of application No. 13/307,429, filed on Nov. 30, 2011, now Pat. No. 9,252,988.

(51) Int. Cl.
*H04B 10/61*    (2013.01)
*H04J 14/06*    (2006.01)
(Continued)

(52) U.S. Cl.
CPC ........ *H04B 10/532* (2013.01); *H04B 10/6166* (2013.01); *H04J 14/06* (2013.01);
(Continued)

(58) Field of Classification Search
CPC ..... H04B 10/61; H04B 10/614; H04B 10/611; H04B 10/6161; H04B 10/613; H04B 10/616; H04B 10/6165; H04B 10/6166; H04B 10/6151; H04B 10/612; H04J 14/06
See application file for complete search history.

(56) References Cited

U.S. PATENT DOCUMENTS 9,252,988 B2 * 2/2016 Zhou ................. H04B 10/6166

OTHER PUBLICATIONS

Zhou et al., Multi-Level, Multi-Dimensional Coding for High-Speed and High-Spectral-Efficiency Optical Transmission, Aug. 15, 2009, Journal of Lightwave Technology, vol. 27, No. 16, pp. 3641-3653.*

(Continued)

*Primary Examiner* — Toan Le
(74) *Attorney, Agent, or Firm* — Chiesa Shahinian & Giantomasi PC

(57) ABSTRACT

A method for modifying the performance of an adaptive equalizer in a receiver is provided. A carrier wave comprising a first polarization state and a second polarization state, wherein there is a correlation between the first polarization state and the second polarization state, is received. The first polarization state and the second polarization state are demultiplexed to generate two respective constellations. A first expected value based on the first constellation, and a second expected value based on the second constellation, are calculated. An adaptive equalizer receives a first and second signals associated with the respective polarization states. The adaptive equalizer generates outputs based on the signals. These outputs are used to generate error values. Feedback is input into the adaptive equalizer, wherein the feedback is based on the error values.

20 Claims, 8 Drawing Sheets

(51) Int. Cl.
*H04B 10/532* (2013.01)
*H04L 25/03* (2006.01)

(52) U.S. Cl.
CPC .. *H04L 25/03038* (2013.01); *H04L 25/03057* (2013.01); *H04L 2025/0342* (2013.01); *H04L 2025/03401* (2013.01); *H04L 2025/03687* (2013.01)

(56) References Cited

OTHER PUBLICATIONS

Nelson et al., "Experimental comparison of coherent polarization-switched QPSK to polarization-multiplexed QPSK for 10×100 km WDM transmission," Optics Express (2011) vol. 19, Issue 11, May 23, 2011, pp. 10849-10856.

Zhou et al., "Transmission of 32-Tb/s Capacity Over 580 km Using RZ-Shaped PDM-8QAM Modulation Format and Cascaded Multimodulus Blind Equalization Algorithm," Feb. 15, 2010, Journal of Lightwave Technology, vol. 28, No. 4, pp. 456-465.

Zhou et al., "Parallel Implementation of Adaptive Equalization for High-Speed and Real-Time Optical Coherent Receivers," May 14-15, 2010, 19th Annual Wireless and Optical Communications Conference (WOCC), Shanghai, China, 5 pp.

Zhou et al., Abstract, May 14-15, 1 pp.

Fan et al., "The Comparison of CMA abd LMS Equalization Algorithms in Optical Coherent Receivers," Sep. 23-25, 2010, 6th International Conference on Wireless Communications Networking and Mobile Computing (WICOM), 4 pp.

Abstract of Fan et al., Sep. 23-25, 2010, 1 pp.

\* cited by examiner

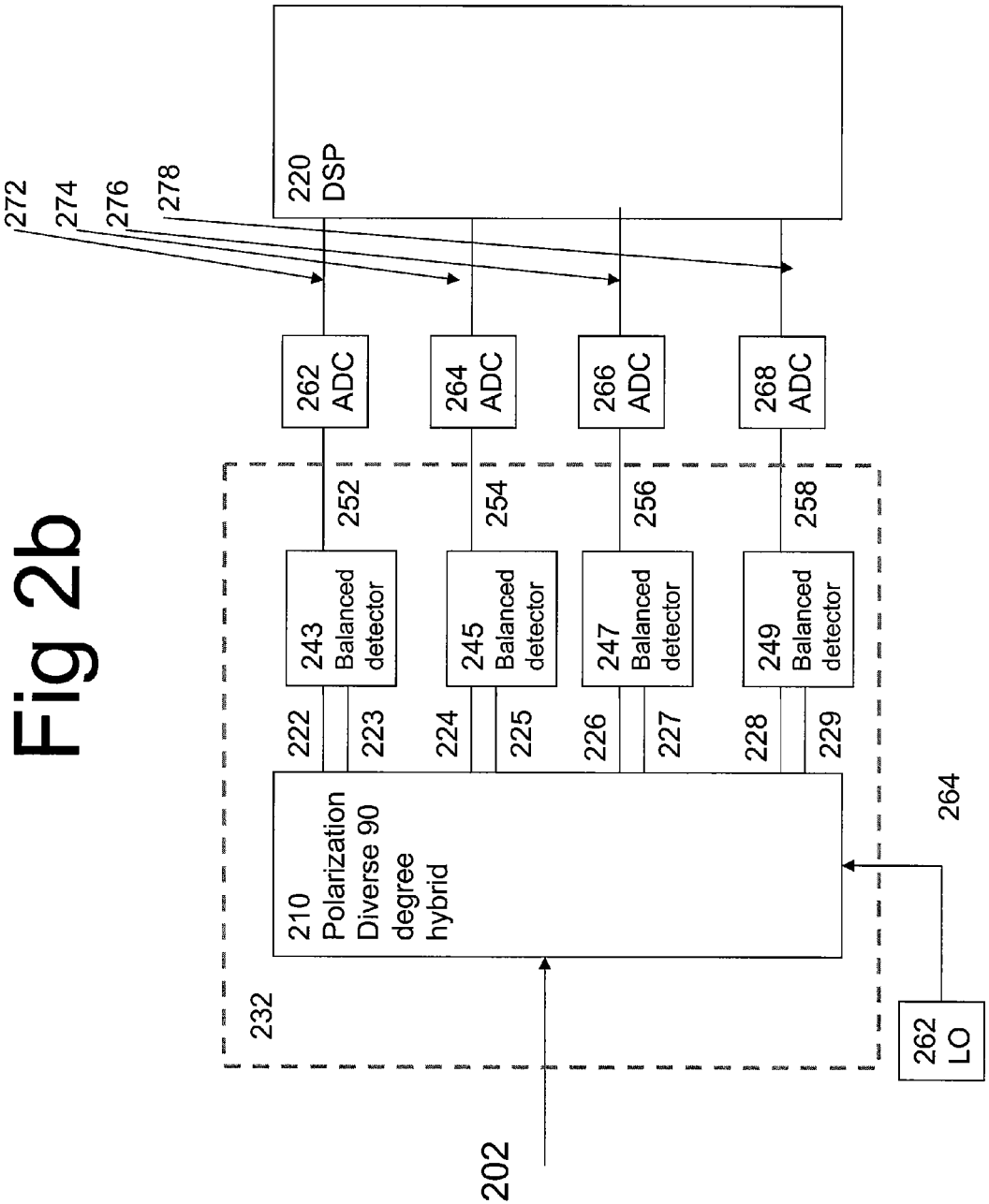

SYSTEM AND METHODS FOR ADAPTIVE EQUALIZATION FOR OPTICAL MODULATION FORMATS

This application is a continuation of U.S. patent application Ser. No. 13/307,429, filed on Nov. 30, 2011, and issued on Feb. 2, 2016 as U.S. Pat. No. 9,252,988, the disclosure of which is incorporated by reference herein in its entirety.

TECHNICAL FIELD

The present disclosure relates generally to optical communications, and more particularly to adaptive equalization for modulated optical signals.

BACKGROUND

The popularity of multimedia communications services over packet data networks, such as the Internet, continues to grow. Consequently, the demand for higher capacity in core data transport networks continues to grow. For service providers, core data transport networks are optical networks based on fiber optic technology. To increase the capacity of optical networks, advanced signal modulation techniques, such as quadrature amplitude modulation (QAM) and quadrature phase shift keying (QPSK) have been developed. The push for higher spectral efficiencies to lower the cost per transmitted bit and the concern about exhausting the fiber bandwidth has focused much recent research work on multi-level, multi-dimensional modulation formats to achieve the ultimate capacity in a single fiber.

Digital coherent detection has proven to be an effective technique for detecting and demodulating the received optical signals based on multi-level, multi-dimensional modulation formats. Although progress has been made, due to the increased optical-signal-to-noise ratio (OSNR) requirements, the reach of these multi-level, multi-dimensional modulation formats is clearly a concern. Thus, power efficient modulation formats, those having a low required signal-to-noise ratio per bit for a given bit-error-ratio, have also received attention, with significant focus on four-dimensional optimized formats (i.e. those using both quadratures and polarization components of the electromagnetic fields). Power-efficient modulation formats are of fundamental importance in optical communications because they provide the ultimate sensitivity limit for the optical channel. Such modulation formats also have practical importance because they enable increased nonlinear tolerance, and therefore the potential for ultra long-haul transmission.

SUMMARY

In accordance with an embodiment, a method and system for modifying the performance of an adaptive equalizer in a receiver is provided. A carrier wave comprising a first polarization state and a second polarization state, wherein there is a correlation between the first polarization state and the second polarization state, is received. A first expected value based on the first polarization state and a second expected value based on the second polarization state are calculated. A first output based on a first signal associated with the first polarization state and a second output based on a second signal associated with the second polarization state are equalized. A first error based on the first expected value and the first output and a second error based on the second expected value and the second output are calculated. A feedback signal is generated based on the first error, the first output and the correlation.

In some embodiments, the first output and the second output are equalized by an adaptive equalizer that comprises a plurality of finite impulse response filters. In certain embodiments, a particular finite-impulse response filter of the plurality of finite-impulse response filters is modified based on the feedback based on the first error, the first signal and the complex conjugate of the first signal. In certain embodiments, the first output is determined based on the first signal, the tap weight, and the second signal.

These and other advantages of the present disclosure will be apparent to those of ordinary skill in the art by reference to the following Detailed Description and the accompanying drawings.

BRIEF DESCRIPTION OF THE DRAWINGS

FIG. 2b shows a schematic illustration of a digital coherent receiver in accordance with an embodiment;

DETAILED DESCRIPTION

In accordance with an embodiment, a system that implements a constrained multi-modulus algorithm (MMA) may be used as part of a receiver of a signal formatted according to a four-dimensionally-optimized PS-QPSK (polarization switched-quadrature phase shift keying) modulation format. A receiver operating in accordance with an embodiment may exploit the signal correlation between the two orthogonal polarizations of the four-dimensionally-optimized PS-QPSK modulation formatted signal. The receiver may de-multiplex the PS-QPSK signal in each of the two orthogonal polarizations as a five-point constellation (1, j, −1, −j, 0) by minimizing the cross correlation between the two orthogonal polarization states.

In processing PS-QPSK signals, a constellation diagram may be used to identify characteristics of a signal. The constellation diagram is a similar to a scatter plot made in a complex plane where each point in the scatter plot corresponds to a value of a signal received in a specific sample of the signal. Generally the scatter plot will have certain properties that will correspond to the properties of the signal being sampled. A constellation diagram may be a representation of a signal modulated by a digital modulation scheme such as quadrature amplitude modulation or phase-shift keying. A constellation diagram may display samples of the signal as a two-dimensional scatter diagram in the complex plane at symbol sampling instants. A constellation diagram represents the possible symbols that may be selected by a given modulation scheme as points in the complex plane. Constellation diagrams may be used to recognize the type of interference and distortion in a signal. The interference and distortion in a signal may be characterized by determining properties of the associated constellation diagram, for example a modulus or a radius of the distribution of points in the plots. A particular example of a constellation diagram that may be generated by a PS-QPSK signal may be five-points in the complex plane at positions (1, j, −1, −j, 0). Examples of constellation diagrams that may be generated in accordance with an embodiment of the present disclosure are in FIG. 4 and FIG. 5 of the present disclosure. FIG. 4 and FIG. 5 are described in more detail in the foregoing detailed description.

An embodiment of the present disclosure resolves a convergence singularity problem that may occur in processing PS-QPSK formatted signals. Embodiments of the disclosed system may also be applicable to other signal coding formats, for example: four-dimensional-coded optical modulation formats such as polarization-switched M-ary PSK or M-ary QAM.

Figure 1:
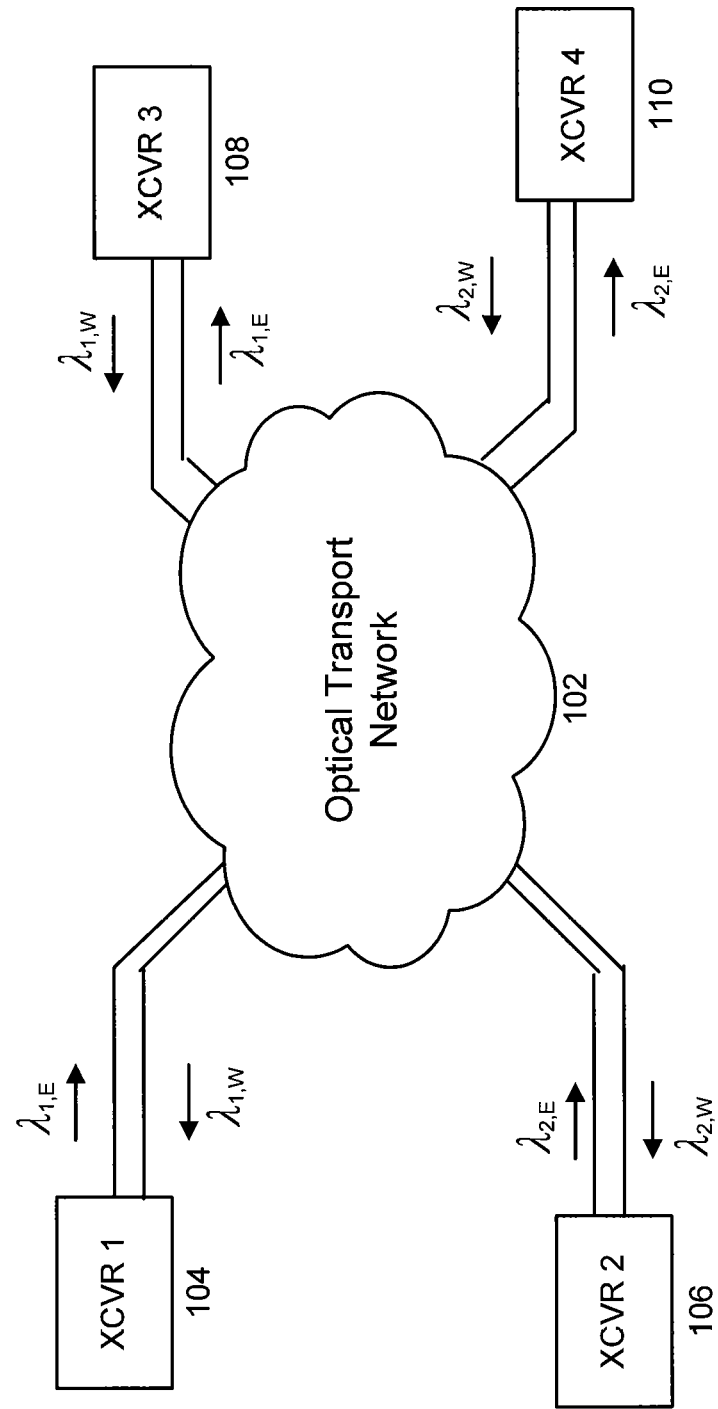
FIG. 1 shows a schematic of a generic optical communications system.

FIG. 1 shows a schematic of an optical communications system in accordance with an embodiment. Multiple transceivers (XCVRs) send signals and receive signals via optical transport network 102. Shown are four representative transceivers, referenced as XCVR 1 104, XCVR 2 106, XCVR 3 108, and XCVR 4 110, respectively. In some communications systems, transport network 102 may include optical components. In other communications systems, transport network 102 may include optical components, electronic components, or optoelectronic components. The transport medium in transport network 102 may be optical fiber, an electrical conductor, air or another appropriate medium.

Figure 2A:
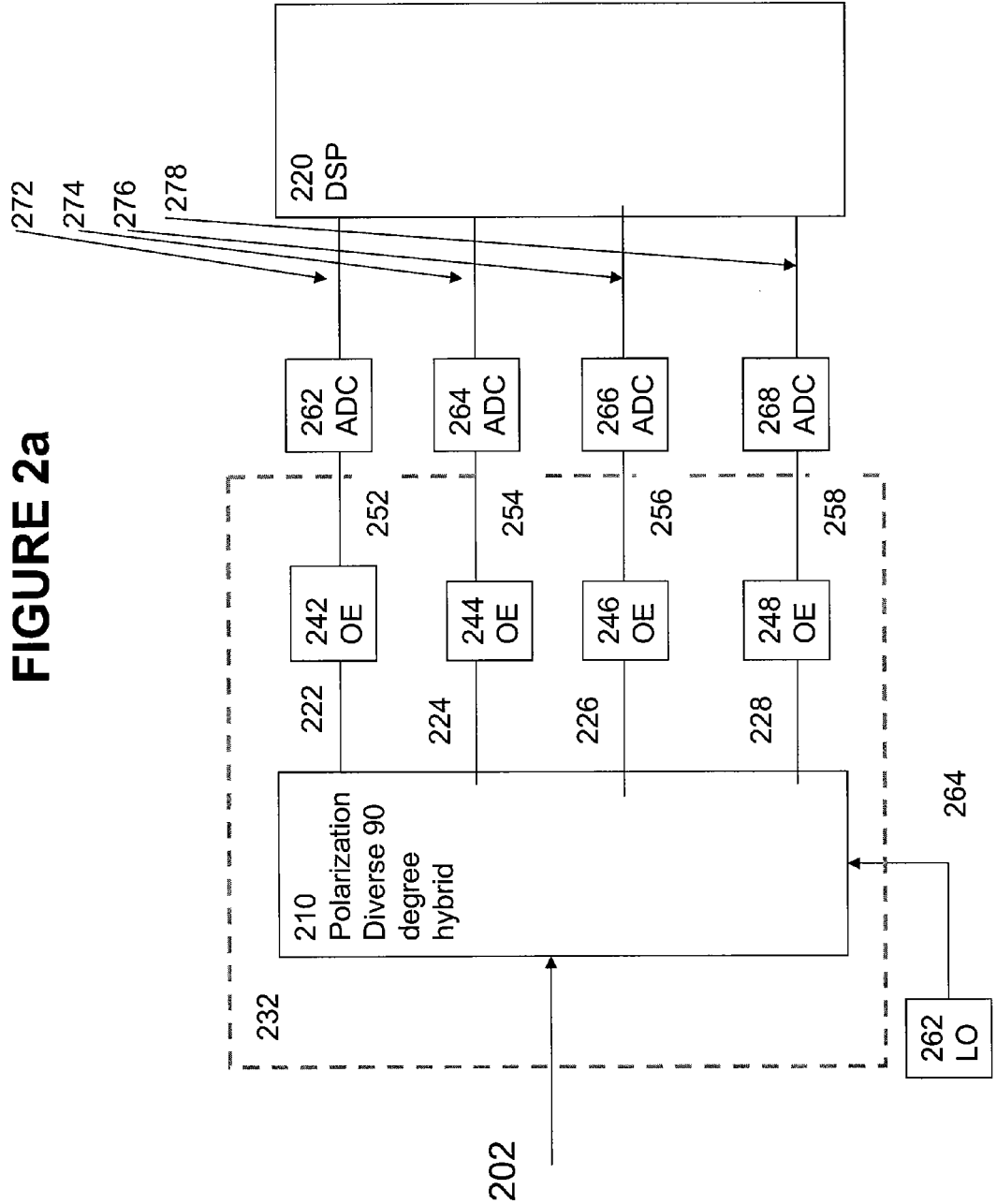
FIG. 2a shows a schematic illustration of a digital coherent receiver in accordance with an embodiment.

FIG. 2a shows a schematic of an example of a digital coherent receiver 232 that may be used to receive four dimensionally coded optical modulation formats in accordance with an embodiment. For example, digital coherent receiver may correspond to a particular example of a receiver that is part of a transceiver, such as XCVR 1 as shown in FIG. 1. Input beam 202, with wavelength λ, is received from optical transport network 102 (see FIG. 1). Input beam 202 may, for example be an optical carrier wave modulated with information symbols on two orthogonal polarizations, e.g. the X and Y polarization states. The digital coherent receiver 232 receives input beam 202 and determines the amplitude, frequency, and phase of the input beam 202. In an embodiment, input beam 202 may be a modulated optical carrier wave that is processed by digital coherent receiver 232 to recover and decode the information symbols. Once received at digital coherent receiver 232, input beam 202 may be transmitted into a polarization diverse 90 degree hybrid 210 which serves as a polarization and phase-diverse coherent mixer. Local oscillator source 262 may generate a reference continuous-wave optical signal 264, with wavelength λ (or close to λ). Reference signal 264 may be transmitted into polarization diverse 90 degree hybrid 210 for use in processing and decoding input beam 202.

Polarization diverse 90 degree hybrid 210 mixes input beam 202 with signal 264 and generates four optical beams 222, 224, 226, and 228, corresponding to the in-phase and quadrature components in the two orthogonal polarization states (relative to the reference signal 264). The four optical beams 222, 224, 226, and 228 are transmitted into opto-electrical converters 242, 244, 246, and 248 respectively. Each opto-electrical converter 242, 244, 246, and 248 receives the respective carrier optical beam 222, 224, 226, and 228 and reference optical beam 262 and generates corresponding analog electrical signals 252 and 256 and quadrature electrical signals 254 and 258. Thus, each opto-electrical converter (OE) 242, 244, 246, and 248 processes the received signal and outputs an analog signal 252, 254, 256, and 258 based on its received input optical signal 222, 224, 226, and 228 respectively. In an embodiment, OE 242 generates an analog electrical signal 252 that corresponds to the real-part of the X polarization of input beam 202. In an embodiment, OE 244 generates an analog electrical signal 254 that corresponds to the imaginary-part of the X polarization of input beam 202. In an embodiment, OE 246 generates an analog electrical signal 256 that corresponds to the real-part of the Y polarization of input beam 202. In an embodiment, OE 248 generates an analog electrical signal 258 that corresponds to the imaginary-part of the Y polarization of input beam 202. Each of these signal are digitized in a respective analog-to-digital converter (ADC) 262, 264, 266, and 268, which generate corresponding digitized electrical signals 272, 274, 276, and 278. These signals 272, 274, 276, and 278 are transmitted to a digital signal processor (DSP) such as DSP 220 for further processing. In another embodiment shown in FIG. 2b, the polarization-diverse 90 degree hybrid may have four pairs of output optical signals 222 and 223, 224 and 225, 226 and 227, and 228 and 229: two pairs for the X polarization, resulting from mixing the signal's electric field with that of a local oscillator (LO) with 0 and $\pi$, and $\pi/2$ and $3\pi/2$ relative phase differences, and two pairs for the Y polarization resulting from mixing the signal's electric field with that of the LO with 0 and $\pi$, and $\pi/2$ and $3\pi/2$ relative phase differences. These four pairs of output optical signals are coupled to respective pairs of balanced, matched photo-detectors 243, 245, 247, and 249 whose electrical outputs are subtracted to improve the signal-to-noise ratio of the resulting electrical signals 252, 254, 256, and 258, which are then sent to a respective ADC 262, 264, 266, and 268.

Figure 3:
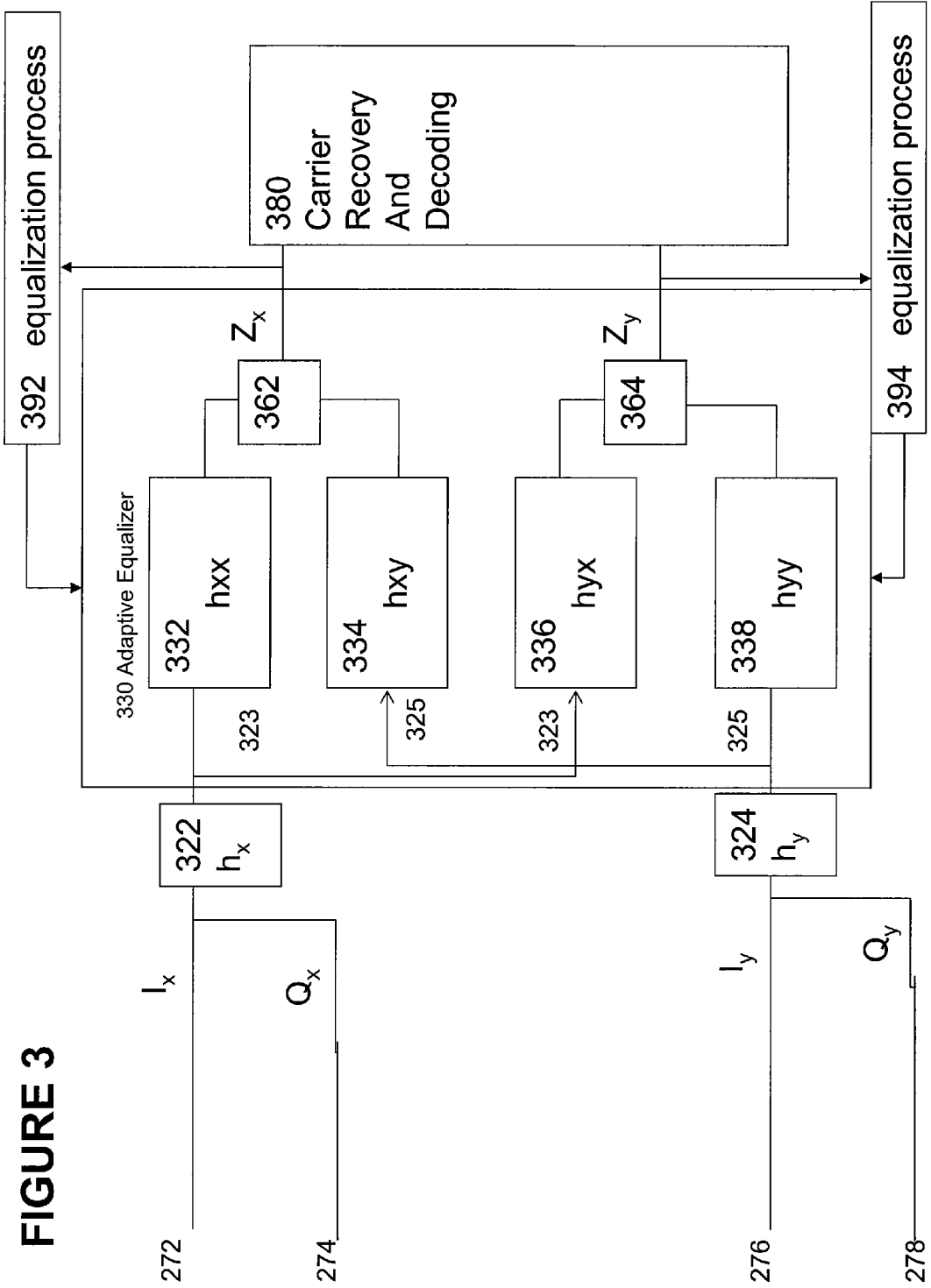
FIG. 3 shows a schematic illustration of a digital coherent receiver that includes a 2×2 adaptive equalizer in accordance with an embodiment.

FIG. 3 shows a schematic of an example of DSP 220 that may be used to process digitized signals 272, 274, 276, and 278 in accordance with an embodiment. As shown in FIG. 3, digitized signals 272 and 274 that correspond to the X-polarization of input beam 202 are input to a finite impulse response filter 322 for static equalization. Digitized signals 276 and 278 that correspond to the Y-polarization of input beam 202 are input to a finite impulse response filter 324 for static equalization. The static equalizer is mainly used to compensate for fiber dispersion.

In an embodiment, each of finite impulse response filters 322 and 324 may provide a signal output. Finite impulse response filter 322 provides an output 323 that is input to an adaptive equalizer 330 and finite impulse response filter 324 provides an output 325 that is input to adaptive equalizer 330. Adaptive equalizer 330 comprises a finite impulse response filter 332, a finite impulse response filter 334, a finite impulse response filter 336, and a finite impulse response filter 338. In addition, adaptive equalizer 330 comprises adder 362 and adder 364. Each of finite impulse response filters 332, 334, 336, and 338 receive feedback and generate outputs. Finite impulse response filters 332 and 334 receive signals 323 and 325, respectively, and in response, generate outputs that are input to adder 362, which sums the two signals and generates output $Z_x$, which corresponds to the X-polarization of input beam 202. Finite impulse response filters 336 and 338 receive signals 323 and 325, respectively, and in response, generate outputs that are input to adder 364, which sums the two signals and generates output $Z_y$, which corresponds to the Y-polarization of beam 202.

In an embodiment, output signals $Z_x$ and $Z_y$ may then be transmitted to carrier recovery and decoding device 380.

Adaptive equalizer 330 receives feedback from an equalization process 392 and an equalization process 394. The feedback signals received by adaptive equalizer 330 may be used to vary the respective tap weights of finite impulse response filters 332, 334, 336, and 338 in order to improve the response of the DSP 220 to signals corresponding to input beam 202.

In an illustrative embodiment of the present disclosure, a constrained MMA may be used to exploit a signal correlation between two orthogonal polarizations in an incoming beam and de-multiplex a PS-QPSK signal in each of the two orthogonal polarizations as a five-point constellation (1, j, −1, −j, 0). The demultiplexing may be performed to minimize the cross correlation between the two orthogonal polarization states in incoming beam.

Figure 6:
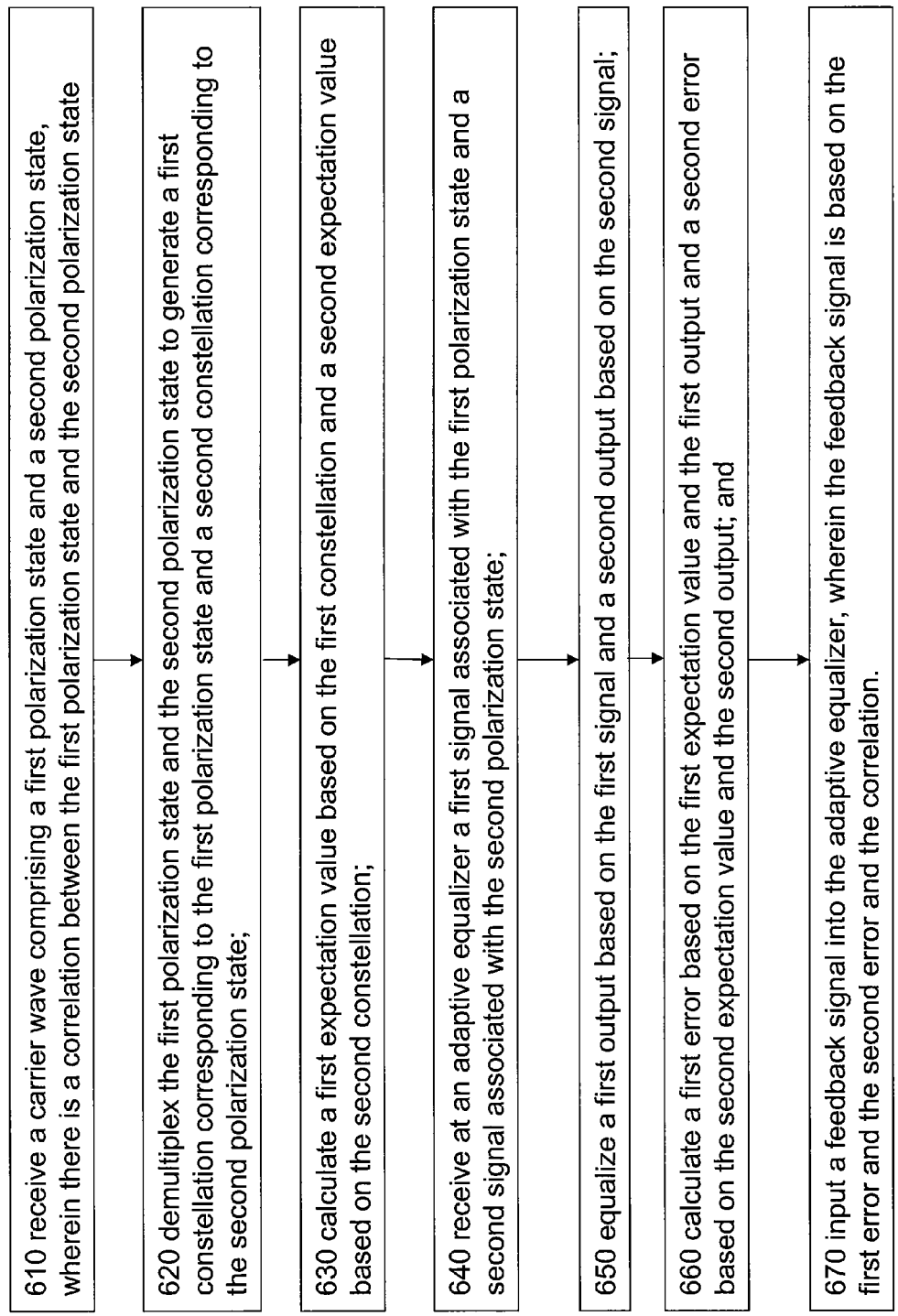
FIG. 6 shows a flow chart of the processing steps for signals processed in accordance with an embodiment.

FIG. 6 is a flow chart of a method of providing feedback to an adaptive equalizer. In accordance with an embodiment, a constrained multi-modulus algorithm (MMA) may be used to generate the feedback provided to adaptive equalizer 330.

At step 610, a carrier wave comprising a first polarization state and a second polarization state is received, wherein there is a correlation between the first polarization state and the second polarization state. In an illustrative embodiment, input beam 202 comprises the carrier wave that is received from optical transport network 102 and arrives at digital coherent receiver 232. Input beam 202 may comprise a four-dimensionally-optimized PS-QPSK modulation format signal. These signals may be processed by elements of a receiver such as those illustrated in FIG. 1 and FIG. 2 in order to generate a signal for further processing.

At step 620, the first polarization state and the second polarization state of input beam 202 are demultiplexed to generate a first constellation corresponding to the first polarization state and a second constellation corresponding to the second polarization state. In an illustrative embodiment, the two polarization states may be demultiplexed by a demultiplexing device such as the adaptive equalizer 330 in DSP 220 which may record a value of each polarization state for each phase. Recorded values from a series of input cycles may be used to generate a constellation diagram corresponding to each polarization state.

At step 630, a first expected value is calculated based on the first constellation and a second expected value is calculated based on the second constellation diagram. Each of the constellation diagrams are populated with data collected from each polarization state of the incoming beam, and based upon the data entered into each diagram, a radius or modulus is calculated. The values of the radius or modulus for each of the X polarization state and the Y polarization state may be stored as the first expected value and the second expected value, respectively. Based on statistics collected from the received signal, data may be collected that corresponds to each of the X-polarization and the Y-polarization components of input beam 202. These data may be used to generate a constellation in the complex plane that corresponds to the degree of distortion and noise in each polarization for incoming beam 202. This constellation may, for example, be five points at positions, (1, j, −1, −j, 0) in the complex plane. Based on this data expected square values of the radius/modulus of the constellation for each polarization may be calculated. These data may be an indication of the noisiness of incoming beam 202.

At step 640, a first signal associated with the first polarization state and a second signal associated with the second polarization state are received at an adaptive equalizer such as adaptive equalizer 330. In an embodiment, adaptive equalizer 330 as shown in FIG. 3 comprises four impulse response filters and may be of a class of adaptive equalizers that is called a 2×2 adaptive equalizer.

At step 650, the adaptive equalizer equalizes the received signals to generate a first output based on the first signal and a second output based on the second signal. In an embodiment, the adaptive equalizer such as adaptive equalizer 330 may be operable to generate a response to an input that varies based on the time varying properties of its input according to feedback it receives. In the foregoing description of the operation of adaptive equalizer 330 and other components of DSP 220, various mathematical equations are disclosed. One skilled in the art will understand that these equations may be implemented in software executed by a processor, hardware or firmware, or in combinations thereof. Having implemented these equations, a machine may be operated which receives signals as inputs and generates electrical outputs as a component of a communication system. In the examples discussed herein reference is made to specific aspects of adaptive equalizer 330, however one skilled in the art will understand how to apply the disclosed techniques to other systems with comparable features. In the foregoing, the symbols, x(n) and y(n), are used to refer to the inputs to the adaptive equalizer, such as outputs of finite impulse response filters 322 and 324 respectively. The outputs of adders 362 and 364, are referred to with symbols $Z_x(n)$ and $Z_y(n)$, respectively.

In an embodiment, adaptive equalizer 330 comprises adders 362 and 364 that generate outputs, $Z_x(n)$ and $Z_y(n)$, which are based on x(n) and y(n). The outputs of adders 362 and 364, $Z_x(n)$ and $Z_y(n)$, may be calculated mathematically according to equation (1) which specifies a mathematical formula for $Z_x(n)$ and equation (2) which specifies a mathematical formula for $Z_y(n)$:

$$Z_x(n) = \sum_{k=0}^{K-1} h_{xx}(n,k)x(n-k) + \sum_{k=0}^{K-1} h_{xy}(n,k)y(n-k) \qquad (1)$$
$$= h_{xx}^T \cdot X + h_{xy}^T \cdot Y$$

$$Z_y(n) = \sum_{k=0}^{K-1} h_{yy}(n,k)y(n-k) + \sum_{k=0}^{K-1} h_{yx}(n,k)x(n-k) \qquad (2)$$
$$= h_{yy}^T \cdot Y + h_{yx}^T \cdot X$$

In equations (1) and (2), $h_{xx}$, $h_{xy}$, $h_{yy}$, $h_{yx}$ refer to tap weights associated with each of finite impulse response filters, such as finite impulse response filters 332, 334, 336, and 338 respectively. These tap weights may be varied for each finite impulse response filter in order to improve the response of adaptive equalizer 330 to input signals. Generally each of the finite response filters associated with $h_{xx}$, $h_{xy}$, $h_{yy}$, $h_{yx}$ respectively may have a frequency dependent response and may be characterized as a complex number. Thus, each of $h_{xx}$, $h_{xy}$, $h_{yy}$, $h_{yx}$ will have an associated Hermite conjugate, which is denoted: $h^T_{xx}$, $h^T_{xy}$, $h^T_{yy}$, $h^T_{yx}$. In accordance with an embodiment, each finite impulse response filter will have length K taps.

At step 660, a first error based on the first expected value and the first output and a second error based on the second expected value and the second output are calculated. In an embodiment, the first error and the second error may be calculated, for example, at equalization process 392 and 394. These calculations may be performed based on the expected square values of the radius/modulus of the constellation for each polarization calculated in step 630 and the outputs generated by adders 362 and 364. In the foregoing equations, $R_x(n)$ and $R_y(n)$ refer to the expected square values of the radius/modulus of the constellation associated with the X- and Y-polarizations, respectively. Using the output of equations (1) and (2), and the values of $R_x(n)$ and $R_y(n)$, equation (3) provides a means for calculating errors $\epsilon$ associated with each of the respective X-polarization and the Y-polarization of incoming beam 202.

$$\epsilon_x(n) = |Z_x(n)|^2 - R_x(n)$$

$$\epsilon_y(n) = |Z_y(n)|^2 - R_y(n) \quad (3)$$

where equation (3) is constrained by the conditions specified in equation (4).

$$R_x(n) = E\{|Z_x(n)|^2 + |Z_y(n)|^2\} \text{ and } R_y(n) = 0,$$
$$\text{if } |Z_x(n)|^2 > |Z_y(n)|^2$$

$$R_x(n) = 0 \text{ and } R_y(n) = E\{|Z_x(n)|^2 + |Z_y(n)|^2\},$$
$$\text{if } |Z(n)|^2 < |Z_y(n)|^2 \quad (4)$$

for the case when $|Z_x(n)| = |Z_y(n)|$, $\epsilon_x = \epsilon_y = 0$.

According to an embodiment of the present disclosure, due to the correlation of X and Y polarizations, $R_x(n)$ and $R_y(n)$ are correlated and this may be used to generate constraints such as those specified in equation (4). In particular, the values for $R_x(n)$ and $R_y(n)$ are constrained by the instantaneous values of $Z_x(n)$ and $Z_y(n)$.

At step 670, a feedback signal is input into the adaptive equalizer, wherein the feedback signal is based on the first error and the second error and the correlation. In an exemplary embodiment, the feedback signal is generated by equalization process 392 and 394. The feedback signal provided to adaptive equalizer 330 updates the filter coefficients by using a steepest gradient algorithm, described by equation (5), where the $\epsilon_x$ and $\Sigma_y$ are the feedback errors for the two polarizations, $$\frac{d\langle\varepsilon_x^2\rangle}{dh_{xx}} = 0; \; \frac{d\langle\varepsilon_x^2\rangle}{dh_{xy}} = 0; \; \frac{d\langle\varepsilon_y^2\rangle}{dh_{yy}} = 0; \; \frac{d\langle\varepsilon_y^2\rangle}{dh_{yx}} = 0; \quad (5)$$

According to an embodiment of the present disclosure, the feedback signal and hence optimal tap weights, may be calculated based on the constraints defined in equation (4). Using these constraints, equations (6)-(9) may be used to generate optimal tap weights for finite impulse response filters 332, 334, 336, and 338. In particular, in equations (6)-(9), instantaneous values for the tap weights may be used to generate updated tap weights for each of finite impulse response filters 332, 334, 336, and 338 according to the following equations:

$$h_{xx} \rightarrow h_{xx} + \mu \epsilon_x Z_x \cdot \overline{X} \quad (6)$$

$$h_{xy} \rightarrow h_{xy} + \mu \epsilon_x Z_x \cdot \overline{Y} \quad (7)$$

$$h_{yx} \rightarrow h_{yx} + \mu \epsilon_y Z_y \cdot \overline{X} \quad (8)$$

$$h_{yy} \rightarrow h_{yy} + \mu \epsilon_y Z_y \cdot \overline{Y} \quad (9)$$

In equations (6)-(9), the symbol $\mu$ denotes a convergence parameter that may be selected to tune the response speed of the adaptive filter and $\overline{X}$ and $\overline{Y}$ denote the complex conjugates of X and Y, respectively. The calculations indicated by equations (6)-(9) may be performed, for example, as part of equalization process 392 and equalization process 394. The calculations associated with equalization processes 392 and 394 may be executed on, for example, a computer, an ASIC, a DSP or a similar device for performing such calculations.

In an embodiment, a means for receiving the input beam 202, such as a carrier wave may be a receiver such as XCVR 1 104, XCVR 2 106, XCVR 3 108, and XCVR 4 110. The demultiplexing may be performed by a DSP or other similar device used for demultiplexing a signal. Such a DSP may comprise a CPU and memory or other components of a computer, which function in order to generate and store data corresponding to a constellation associated with a particular polarization state of a particular signal. Receiving a signal and equalizing an output may be performed by an adaptive equalizer such as a 2×2 adaptive equalizer. The error may be calculated by a CPU or other similar device. The feedback signal may be input by a signal generator or other similar device.

An embodiment of this disclosure has been used to perform tests to determine the effectiveness of these techniques. Based on the results of these tests, the proposed techniques optimize the equalizer toward minimum cross-correlation for an incoming beam 202 that comprises two polarizations.

An embodiment of these techniques has been used to experimentally verify its effectiveness in a recent study involving a 40.5-Gb/s PS-QPSK. FIG. 4 and FIG. 5 illustrate recovered constellation diagrams in both X and Y-polarization for a back-to-back measurement, and after 10×100 km standard single mode fiber (SSMF), wavelength division (WDM) transmission, respectively.

Figures 4A, 4B:
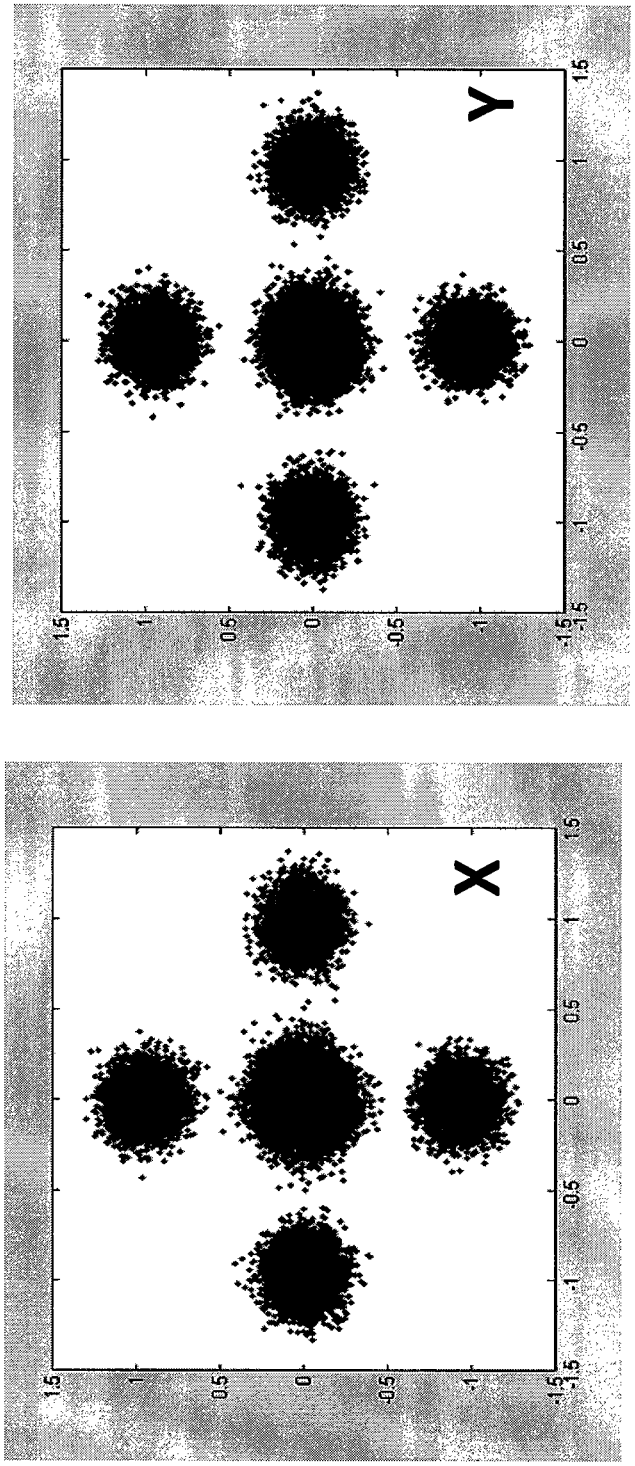
FIG. 4a and FIG. 4b show recovered constellation diagrams for signals processed in accordance with an embodiment.

FIGS. 4a and 4b shows a recovered constellation diagrams for an X polarization signal (FIG. 4a) and a Y polarization signal (FIG. 4b). The distributions shown in these constellations were generated during a test using a 40.5 Gb/s PS-QPSK signal input to an adaptive equalizer in accordance with an embodiment. In this test, the PS-QPSK signal was recovered for back-to-back, with no additional noise loading.

Figure 5B:
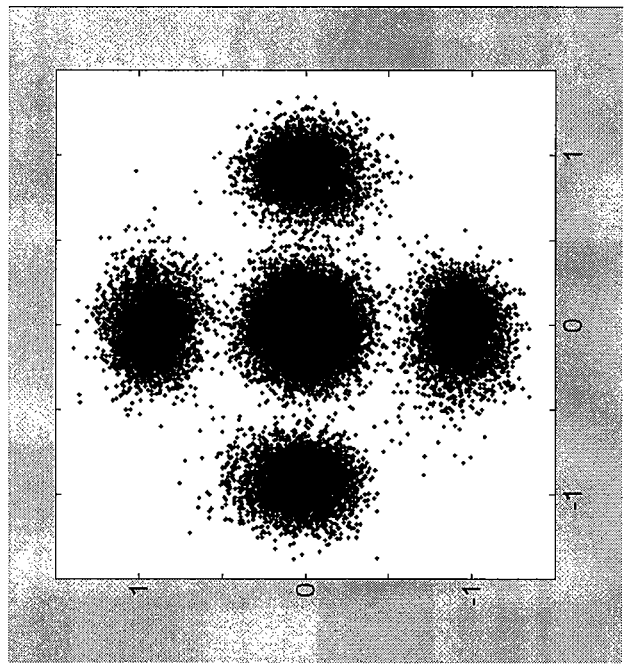
FIG. 5a and FIG. 5b show recovered constellation diagrams for signals processed in accordance with an embodiment.
Figure 5A:
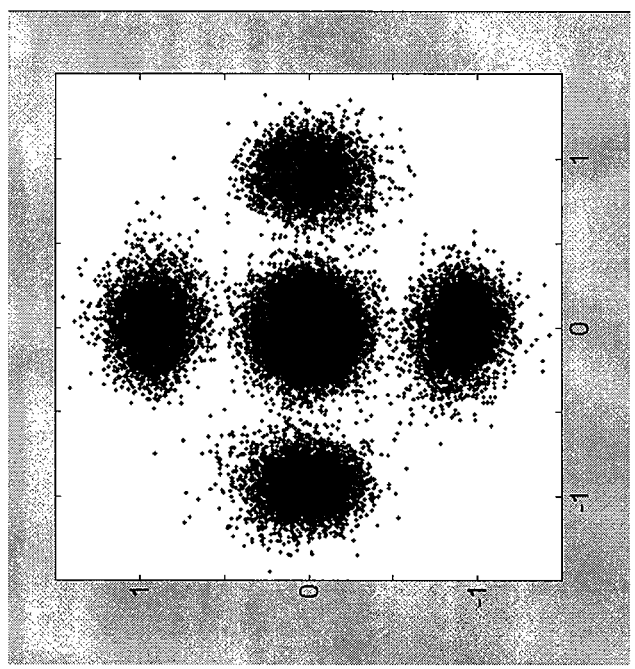

FIGS. 5a and 5b shows a recovered constellation diagrams for an X polarization signal (FIG. 5a) and a Y polarization signal (FIG. 5b). The distributions shown in these constellations were generated during a test using a 40.5 Gb/s PS-QPSK constellation diagram after 10×100 km standard single mode fiber (SSMF), wavelength division (WDM) transmission for 5 dBm/ch launch power and 18.3 dB received OSNR (with loading noise added).

These results have shown that the technique has very robust convergence performance and therefore may be used as either an independent blind equalization algorithm for PS-QPSK or as a pre-convergence equalization algorithm for PS-QPSK in combination with the use of the well known decision-directed least-mean-square algorithm. The techniques disclosed herein may be used to inherently eliminate the convergence singularity problem and may be useful for the practical implementation of PS-QPSK modulation format for optical communication systems at 100 Gb/s and higher rates. The principles applied in the techniques disclosed herein may also be applicable to other four-dimensional-coded optical modulation formats such as polarization-switched M-ary PSK or M-ary QAM.

Figure 7:
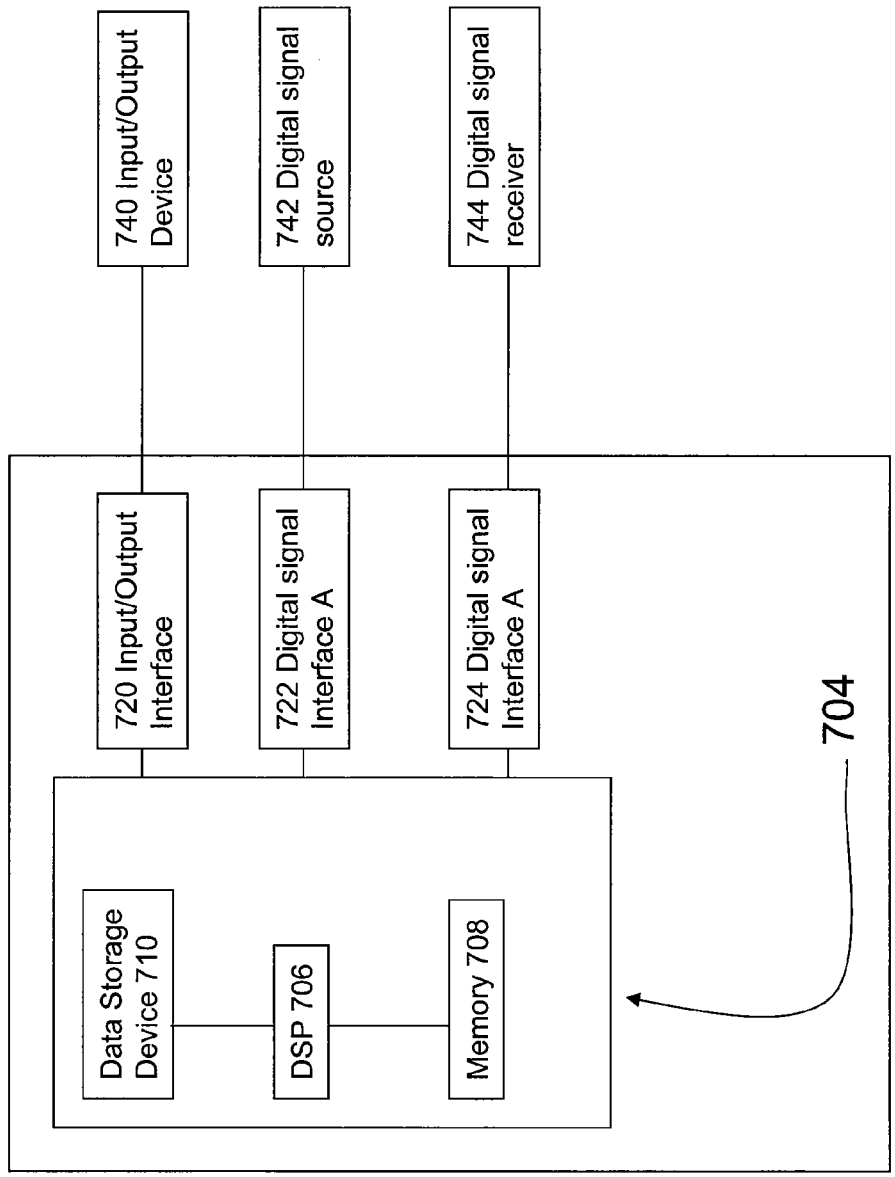
FIG. 7 shows a schematic of a computational system in accordance with an embodiment.

FIG. 7 shows an example of a computational system 702 for performing a constrained multi-modulus algorithm as part of a receiver of a signal formatted according to a four-dimensionally-optimized PS-QPSK modulation format. One skilled in the art can construct the computational system 702 from various combinations of hardware and software (including firmware). One skilled in the art can construct the computational system 702 from various combinations of electronic components, such as general purpose microprocessors, digital signal processors (DSPs), application-specific integrated circuits (ASICs), field-programmable gate arrays (FPGAs), random access memory, and non-volatile read-only memory.

Computational system 702 comprises computer 704, which includes a digital signal processor (DSP) 706, memory 708, and data storage device 710. Data storage device 710 comprises at least one non-transitory, persistent, tangible computer readable medium, such as non-volatile semiconductor memory (data storage device 710 can also comprise other non-transitory, persistent, tangible computer readable medium with sufficiently high data transfer rates).

Computational system 702 further comprises input/output interface 720, which interfaces computer 704 with input/output device 740. Data, including computer executable code can be transferred to and from computer 704 via input/output interface 720. Computational system 702 further comprises digital signal interface A 722, which interfaces computer 704 with digital signal source 742. An example of digital signal source 742 is a DSP functional block such as a finite impulse response filter 322 that outputs a digital signal x(n). Computational system 702 further comprises digital signal interface A 724, which interfaces computer 704 with digital signal receiver 744. An example of digital signal receiver 744 is a DSP functional block performing carrier recovery and decoding 380 that may receive an output digital signal, such as $Z_y(n)$.

As is well known, a computer operates in conjunction with computer software, which may define the overall operation of the computer and its associated applications. DSP 706 may control the overall operation of the computer and applications by executing computer program instructions that define the overall operation and applications. The computer program instructions can be stored in data storage device 710 and loaded into memory 708 when execution of the program instructions is desired. The method steps shown in the flowchart in FIG. 6 can be defined by computer program instructions stored in memory 708 or in data storage device 710 (or in a combination of memory 708 and data storage device 710) and controlled by DSP 706 executing the computer program instructions. For example, the computer program instructions can be implemented as computer executable code programmed by one skilled in the art to perform algorithms implementing the method steps shown in the flowchart in FIG. 6. Accordingly, by executing the computer program instructions, the DSP 706 executes algorithms implementing the method steps shown in the flowchart in FIG. 6.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A method, comprising:
receiving a carrier wave comprising a first polarization state and a second polarization state, wherein a correlation exists between the first polarization state and the second polarization state;
generating a first constellation corresponding to the first polarization state and a second constellation corresponding to the second polarization state;
calculating a first expected value based on the first constellation and a second expected value based on the second constellation;
equalizing, by an adaptive equalizer, a first output based on a first signal associated with the first polarization state and a second output based on a second signal associated with the second polarization state;
calculating a first error based on a difference between the first expected value and the first output, the first expected value being constrained based on the first output and the second output;
calculating a second error based on a difference between the second expected value and the second output, the second expected value being constrained based on the first output and the second output;
generating a feedback signal based on the first error, the second error and the correlation; and
determining coefficients for filters of the adaptive equalizer using the feedback signal.

2. The method as recited in claim 1, where the generating a first constellation corresponding to the first polarization state and a second constellation corresponding to the second polarization state comprises:
demultiplexing the first polarization state and the second polarization state to generate the first constellation and the second constellation using a demultiplexer.

3. The method as recited in claim 1, wherein the first constellation comprises a plurality of data points associated with the first polarization state and wherein the data points are associated with a diagram in a complex plane, the diagram comprising a plurality of vertices, each of the respective vertices located at a respective position (1, j, −1, −j, 0) in the complex plane.

4. The method as recited in claim 1, wherein the first expected value is calculated based on an expected square value of a modulus of the first constellation.

5. The method as recited in claim 1, wherein the first error and the second error are calculated using the following equations:

$$\epsilon_x(n)=|Z_x(n)|^2-R_x(n),$$

$$\epsilon_y(n)=|Z_y(n)|^2-R_y(n)$$

wherein $Z_x(n)$ corresponds to the first output, $Z_y(n)$ corresponds to the second output, $R_x(n)$ is the first expected value, and $R_y(n)$ is the second expected value.

6. The method as recited in claim 1, wherein the carrier wave is modulated according to at least one of polarization-switched m-ary phase shift keying and polarization-switched m-ary quadrature amplitude modulation.

7. The method as recited in claim 1, wherein the carrier wave comprises at least one of an optical carrier wave and a radio-frequency carrier wave.

8. The method as recited in claim 1, wherein the generating a feedback signal comprises:
generating the feedback signal using a steepest gradient algorithm.

9. The method as recited in claim 1, wherein the adaptive equalizer comprises a plurality of finite impulse response filters.

10. A system, comprising:
a receiver for receiving a carrier wave comprising a first polarization state and a second polarization state, wherein a correlation exists between the first polarization state and the second polarization state;
an adaptive equalizer for:
generating a first constellation corresponding to the first polarization state and a second constellation corresponding to the second polarization state;
equalizing a first output based on a first signal associated with the first polarization state and a second output based on a second signal associated with the second polarization state;
a processor; and
a memory to store computer program instructions, the computer program instructions when executed on the processor cause the processor to perform operations comprising:
calculating a first expected value based on the first constellation and a second expected value based on the second constellation;
calculating a first error based on a difference between the first expected value and the first output, the first expected value being constrained based on the first output and the second output;
calculating a second error based on a difference between the second expected value and the second output, the second expected value being constrained based on the first output and the second output; and
generating a feedback signal based on the first error, the second error and the correlation;
the adaptive equalizer further for determining coefficients for filters of the adaptive equalizer using the feedback signal.

11. The system as recited in claim 10, wherein the adaptive equalizer is further for demultiplexing the first polarization state and the second polarization state to generate the first constellation and the second constellation.

12. The system as recited in claim 10, wherein the first constellation comprises a plurality of data points associated with the first polarization state and wherein the data points are associated with a diagram in a complex plane, the diagram comprising a plurality of vertices, each of the respective vertices located at a respective position $(1, j, -1, -j, 0)$ in the complex plane.

13. The system as recited in claim 10, wherein the first expected value is calculated based on an expected square value of a modulus of the first constellation.

14. The system as recited in claim 10, wherein the first error and the second error are calculated using the following equations:

$$\epsilon_x(n) = |Z_x(n)|^2 - R_x(n),$$

$$\epsilon_y(n) = |Z_y(n)|^2 - R_y(n)$$

wherein $Z_x(n)$ corresponds to the first output, $Z_y(n)$ corresponds to the second output, $R_x(n)$ is the first expected value, and $R_y(n)$ is the second expected value.

15. The system as recited in claim 10, wherein the carrier wave is modulated according to at least one of polarization-switched m-ary phase shift keying and polarization-switched m-ary quadrature amplitude modulation.

16. A non-transitory computer readable medium storing computer program instructions for processing a carrier wave to provide feedback to an adaptive equalizer, the carrier wave comprising a first polarization state and a second polarization state, wherein a correlation exists between the first polarization state and the second polarization state, the computer program instructions, when executed on a processor, cause the processor to perform operations comprising:
calculating a first expected value based on a first constellation corresponding to the first polarization state and a second expected value based on a second constellation corresponding to the second polarization state;
calculating a first error based on a difference between the first expected value and a first output, the first output being generated by equalizing a first signal associated with the first polarization state, the first expected value being constrained based on the first output and the second output;
calculating a second error based on a difference between the second expected value and a second output, the second output being generated by equalizing a second signal associated with the second polarization state, the second expected value being constrained based on the first output and the second output;
generating a feedback signal based on the first error, the second error and the correlation; and
transmitting the feedback signal to the adaptive equalizer for determining coefficients for filters of the adaptive equalizer.

17. The non-transitory computer readable medium as recited in claim 16, wherein the first constellation comprises a plurality of data points associated with the first polarization state and wherein the data points are associated with a diagram in a complex plane, the diagram comprising a plurality of vertices, each of the respective vertices located at a respective position $(1, j, -1, -j, 0)$ in the complex plane.

18. The non-transitory computer readable medium as recited in claim 16, wherein the first expected value is calculated based on an expected square value of a modulus of the first constellation.

19. The non-transitory computer readable medium as recited in claim 16, wherein the first error and the second error are calculated using the following equations:

$$\epsilon_x(n) = |Z_x(n)|^2 - R_x(n),$$

$$\epsilon_y(n) = |Z_y(n)|^2 - R_y(n)$$

wherein $Z_x(n)$ corresponds to the first output, $Z_y(n)$ corresponds to the second output, $R_x(n)$ is the first expected value, and $R_y(n)$ is the second expected value.

20. The non-transitory computer readable medium as recited in claim 16, wherein the generating a feedback signal comprises:
generating the feedback signal using a steepest gradient algorithm.

* * * * *